P. J. McGUIRE & H. J. FRONK.
SINK OR BASIN STOPPER.
APPLICATION FILED JAN. 8, 1912.
1,028,374.
Patented June 4, 1912.
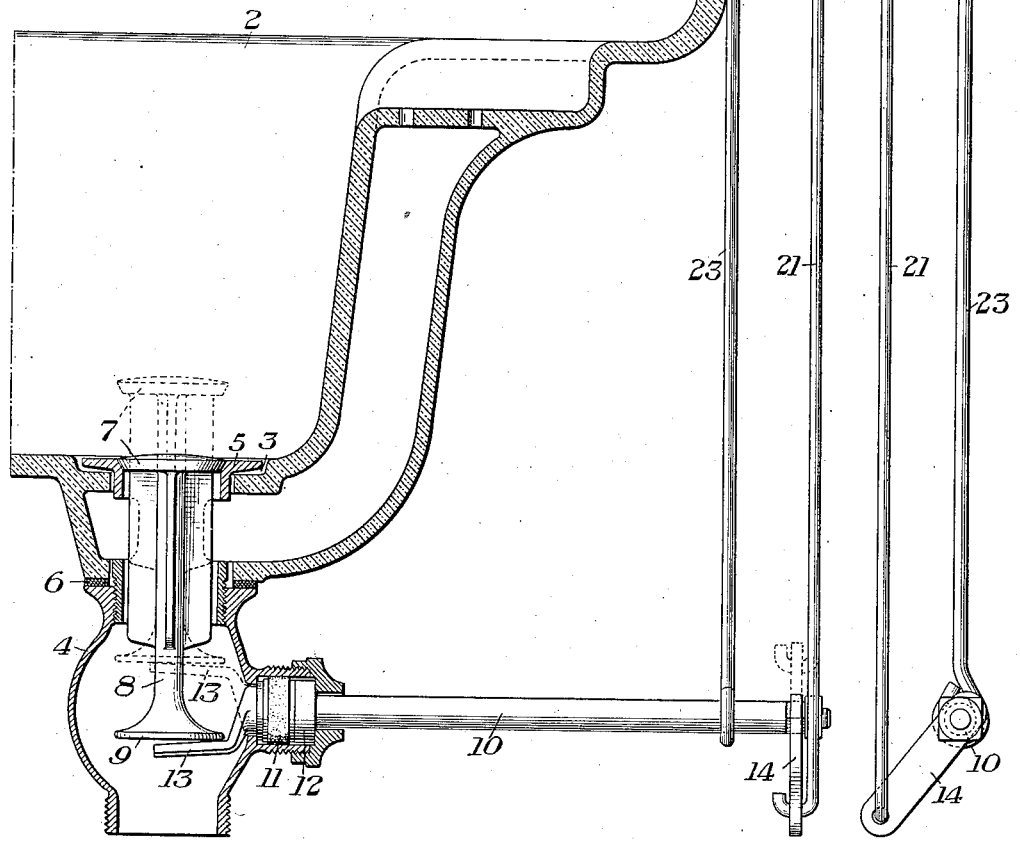

UNITED STATES PATENT OFFICE.

PETER J. McGUIRE, OF WILKINSBURG, AND HOWARD J. FRONK, OF MONACA, PENNSYLVANIA, ASSIGNORS TO UNITED STATES SANITARY MANUFACTURING COMPANY, OF PITTSBURGH, PENNSYLVANIA, A CORPORATION OF PENNSYLVANIA.

SINK OR BASIN STOPPER.

1,028,374. Specification of Letters Patent. Patented June 4, 1912.

Application filed January 8, 1912. Serial No. 669,997.

*To all whom it may concern:*

Be it known that we, PETER J. MCGUIRE, a resident of Wilkinsburg, in the county of Allegheny and State of Pennsylvania, and HOWARD J. FRONK, a resident of Monaca, in the county of Beaver and State of Pennsylvania, have invented a new and useful Improvement in Sink or Basin Stoppers, of which the following is a full, clear, and exact description, reference being had to the accompanying drawings, forming part of this specification, in which—

Figure 1 is a vertical section through a portion of a sink or basin, showing one form of our improved stopper actuating mechanism, Fig. 2 is a rear view of the actuating mechanism, and Fig. 3 is a detail sectional view on the line III—III of Fig. 2.

Our invention relates to an improvement in stopper actuating mechanism for sinks or basins, and is designed to provide a cheap and efficient device of this character which can readily be applied to sinks or basins, and in which the supporting rod forming the bearing for the crank shaft for actuating the stopper can readily be adjusted for different sized basins.

Another object of our invention resides in the provision of a short crank on the actuating shaft which is connected by means of a link to a crank on the stopper lifting shaft, the latter crank being somewhat longer than the crank on the actuating shaft, so that the stopper can be raised when the actuating shaft is rotated in either direction. Further in the provision of means for adjusting the length of the link connecting the two cranks, so that the cranks can readily be adjusted with relation to each other.

The precise nature of our invention will be best understood by reference to the accompanying drawings, which will now be described, it being premised, however, that various changes may be made in the details of construction and arrangement of parts without departing from the spirit and scope of our invention, as defined in the appended claims.

In the drawings, the numeral 2 designates a sink or basin having a drain opening 3 in the bottom thereof. 4 designates a coupling connected to the bottom of the basin by means of a bushing 5 passing through the opening 3, and which is provided with screw threads on its lower end for engaging screw threads in the upper portion of the coupling. Interposed between the top of the coupling and the bottom of the basin is a gasket 6, forming a tight joint between the bottom of the basin and the coupling.

7 is the stopper having a downwardly extending stem 8, and a head 9 on the lower end thereof. Extending outwardly to the side of the coupling 4 is a shaft 10, having a packing ring 11 on a head 12, which is rotatably mounted within a recess on the side of the coupling. This shaft is provided at one end with a crank arm 13 which extends below the head 9 and the other end thereof is provided with a crank 14. The actuating shaft 15 extends through and is rotatably mounted in a flanged bushing 16, which passes through and is secured to an upwardly extending portion 17 of the sink. 18 is a hand wheel on one end of the actuating shaft 15 and 19 is a crank connected to the other end of this shaft. Pivotally mounted on the outer end of the crank 19 is a crank pin 20, having an opening therethrough for a connecting rod 21, the other end of which is connected to the outer end of the crank 14, and 22 is a screw for securing the connecting rod 21 in its adjusted position to the crank pin 20.

23 is a rod, the upper end of which is provided with an eye 24, which is arranged to straddle the sleeve 16, and 25 is a nut on the sleeve 16 for jamming the rod 23 against the back of the upwardly extending extension 17 of the basin. The lower end of this rod 23 is provided with an eye through which the crank shaft 10 extends, and is designed to support the rear end of this shaft.

By reference to Fig. 2 it will readily be seen that the crank 14 is longer than the crank 19, which will permit the actuating shaft 15 to be rotated in either direction, to raise the stopper 7 through the medium of the crank 13.

The advantages of our invention result from the provision of actuating mechanism for the stopper in which the various connections can be adjusted for different sized basins. Further from the provision of actuating mechanism in which the actuating shaft can be rotated in either direction to raise the stopper, and in which the acuating shaft can be freely rotated, and thereby avoid breaking or bending of the parts.

We claim:

1. A closure for basins or sinks, comprising a stopper having a stem extending downwardly through the outlet from the basin, a crank shaft having a crank below said stem for raising the stopper, means for actuating the crank shaft, and an adjustable bearing for said shaft having an elongated slot for permitting such adjustment, and a screw passing through the slot for securing the link in its adjusted position; substantially as described.

2. A closure for basins or sinks, comprising a stopper, a crank shaft having a crank for raising the stopper, a second crank on the crank shaft, an actuating shaft substantially parallel with the crank shaft, a crank on the actuating shaft, said crank on the actuating shaft being shorter than the second crank on the crank shaft, an operating handle on the actuating shaft, and a link connecting the crank on the actuating shaft and the second crank on the crank shaft; substantially as described.

3. A closure for basins or sinks, comprising a stopper, a crank shaft having a crank for raising the stopper, a second crank on the crank shaft, an actuating shaft substantially parallel with the crank shaft, a crank on the actuating shaft, said crank on the actuating shaft being shorter than the second crank on the crank shaft, an operating handle on the actuating shaft, a link connecting the crank on the actuating shaft and the second crank on the crank shaft, an adjustable link connecting the crank on the end of the actuating shaft and the second crank on the crank shaft, and means for securing the link in its adjusted position; substantially as described.

4. A closure for basins or sinks, comprising a stopper extending downwardly through the outlet of the basin, a crank shaft having a crank for raising the stopper, and also having a second crank, an actuating shaft having a crank at one end thereof, the crank on the end of the operating shaft being shorter than the second crank on the first shaft, a link connecting the crank on the actuating shaft and the second crank on the crank shaft, a handle on the other end of the actuating shaft, and an adjustable support for one end of the crank shaft; substantially as described.

5. A closure for basins or sinks, comprising a stopper, a crank shaft having a crank for raising the stopper, a second crank on the crank shaft, an actuating shaft substantially parallel with the crank shaft, a crank on the actuating shaft, a bearing for the actuating shaft, a link connection between the crank on the actuating shaft and the second crank on the crank shaft, and means for adjusting said link, an adjustable bearing for the crank shaft, and means for securing the adjustable bearing for the crank shaft to the bearing for the operating shaft; substantially as described.

In testimony whereof, we have hereunto set our hands.

PETER J. McGUIRE.
HOWARD J. FRONK.

Witnesses:
  E. G. DAUGHERTY,
  A. T. RICHARDSON.

---

Copies of this patent may be obtained for five cents each, by addressing the "Commissioner of Patents, Washington, D. C."